US005191828A

United States Patent [19]

McCreery

[11] Patent Number: 5,191,828

[45] Date of Patent: Mar. 9, 1993

[54] TELESCOPIC CYLINDER WITH INCREASED LATERAL LOADING CAPACITY

[76] Inventor: Robert B. McCreery, 524 N. Galloway St., Xenia, Ohio 45385

[21] Appl. No.: 900,297

[22] Filed: Jun. 18, 1992

[51] Int. Cl.[5] .................... F16J 15/18

[52] U.S. Cl. .................... 92/165 R; 92/109; 92/53; 92/51

[58] Field of Search .................... 92/165 R, 51, 52, 53, 92/163, 110, 167; 91/167 R

[56] References Cited

U.S. PATENT DOCUMENTS

| | | | |
|---|---|---|---|
| 2,663,285 | 12/1953 | Johnston et al. | 92/53 |
| 2,872,904 | 2/1959 | Van den Beemt | 92/165 R |
| 2,961,837 | 11/1960 | Suderow | 92/51 |
| 3,087,626 | 4/1963 | Kimball . | |
| 3,186,312 | 6/1965 | Hott et al. | 92/53 |
| 3,431,825 | 3/1969 | Crawley et al. | 92/165 R |
| 3,658,189 | 4/1972 | Brown et al. | 92/52 |
| 4,132,040 | 1/1979 | Grove | 92/165 R |
| 4,337,845 | 7/1982 | Zelli et al. . | |
| 4,359,206 | 11/1982 | McCreery . | |
| 4,479,633 | 10/1984 | McCreery . | |
| 4,867,416 | 9/1989 | Garrett et al. . | |

FOREIGN PATENT DOCUMENTS

| | | | |
|---|---|---|---|
| 0046273 | 4/1977 | Japan | 92/53 |

*Primary Examiner*—Thomas E. Denion

*Attorney, Agent, or Firm*—Jacobson, Price, Holman & Stern

[57] ABSTRACT

An upstanding telescopic cylinder including piston and cylinder sections is provided and the piston and cylinder sections include large, inner and outer relatively telescopingly engaged guide sleeves with the cylinder guide sleeve disposed outermost. The piston section includes small and large diameter guide discs slidably mounted thereon with the small diameter disc lowermost and the piston sleeve includes longitudinally spaced sets of circumferentially spaced notched abutments which successively engage and elevate the large and small diameter discs during extension of the piston section. In addition, the piston section comprises a downwardly opening tubular member and the cylinder section includes a supply and return tubular member loosely telescoped into the tubular member defining the piston section and structure is provided for withdrawing downwardly through the supply and return tubular member, upon full retraction of the piston section, substantially all of the air which may accumulate in the cylinder section.

12 Claims, 2 Drawing Sheets

TELESCOPIC CYLINDER WITH INCREASED LATERAL LOADING CAPACITY

BACKGROUND OF THE INVENTION

1. Field of the Invention

This invention relates to a fluid cylinder incorporating a long stroke and which utilizes relatively high fluid pressure and low fluid volume to lift heavy loads through a substantial vertical distance. It is desirable to utilize relatively high pressure and low volume in order to lift heavy loads through a substantial vertical distance as opposed to utilizing lower pressure and a substantially greater volume of fluid under pressure.

However, the utilization of high pressure and relatively low volume to effect a substantial vertical lift by an extendable and retractable cylinder in the past has meant the use of a cylinder which is relatively small in diameter and thus not operative to withstand lateral forces, particularly when the cylinder approaches its fully extended position.

2. Description of Related Art

Various different forms of fluid cylinders including some of the basic structural and operational features of the instant invention are disclosed in U.S. Pat. Nos. 3,087,626, 4,337,845, 4,359,206, 4,479,633 and 4,867,416. However, these previously known cylinder constructions do not include the plurality of annular guides of the instant invention which are sequentially brought into operation subsequent to initial extension of the cylinder.

SUMMARY OF THE INVENTION

The cylinder of the instant invention utilizes relatively small diameter piston and cylinder components of considerable length in order to effect a lifting action on a load through a considerable vertical distance by utilizing a relatively low volume of fluid under relatively high pressure.

In addition, each of the piston and cylinder components include large diameter sleeves with the piston sleeve being telescoped within the cylinder sleeve and appropriate guiding structure provided between the cylinder and the interior of the piston sleeve and also between the piston and cylinder sleeves. However, similar guide structure is provided on the structure disclosed in the above mentioned prior U.S. Pat. No. 3,087,626 and the cylinder of the instant invention further incorporates successively actuated guiding structure between the exterior of the piston and the interior of the piston sleeve as the piston is extended from its retracted position toward its fully extended position. This successively actuated guiding structure greatly increases the ability of the cylinder to withstand side or lateral loading thereon.

The main object of this invention is to provide an upstanding load lifting cylinder operative through a considerable height range and designed to lift a load through the utilization of relatively low volume, high pressure fluid and to incorporate into the cylinder guiding and side loading withstanding guide structure enabling the cylinder to withstand relatively high side loading.

Another object of this invention is to provide a cylinder in accordance with the preceding objects which incorporates rugged construction for durability in lifting heavy loads through relatively great vertical distances.

Another very important object of this invention is to provide a lifting cylinder capable of withstanding relatively high lateral loading and in which friction is minimized during extension and retraction of the cylinder.

Another very important object of this invention is to provide a cylinder constructed in a manner in which substantially all air which may accumulate in the upper portion of the cylinder thereof may be purged therefrom each time the cylinder is retracted from a fully extended position.

A final object of this invention to be specifically enumerate herein is to provide a cylinder in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
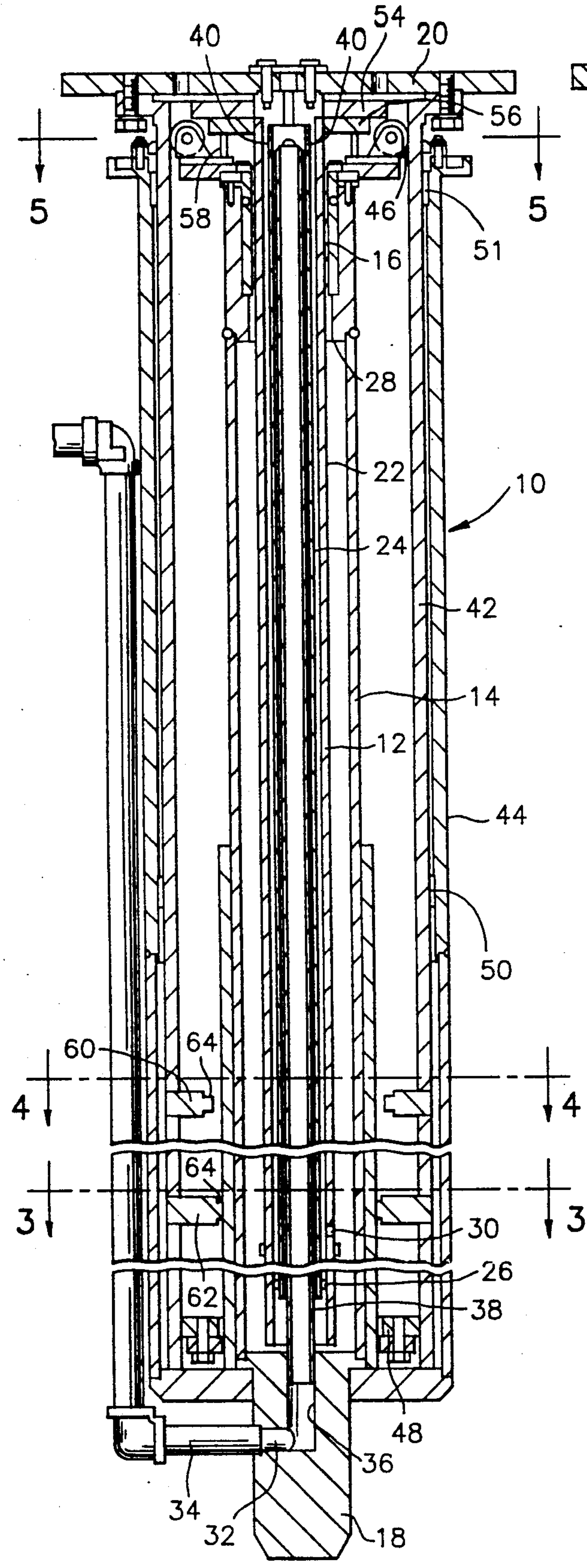
FIG. 1 is a longitudinal vertical sectional view of a cylinder constructed in accordance with the present invention with the piston portion thereof in a fully retracted position and with intermediate length portions of the cylinder being broken away.
Figure 2:
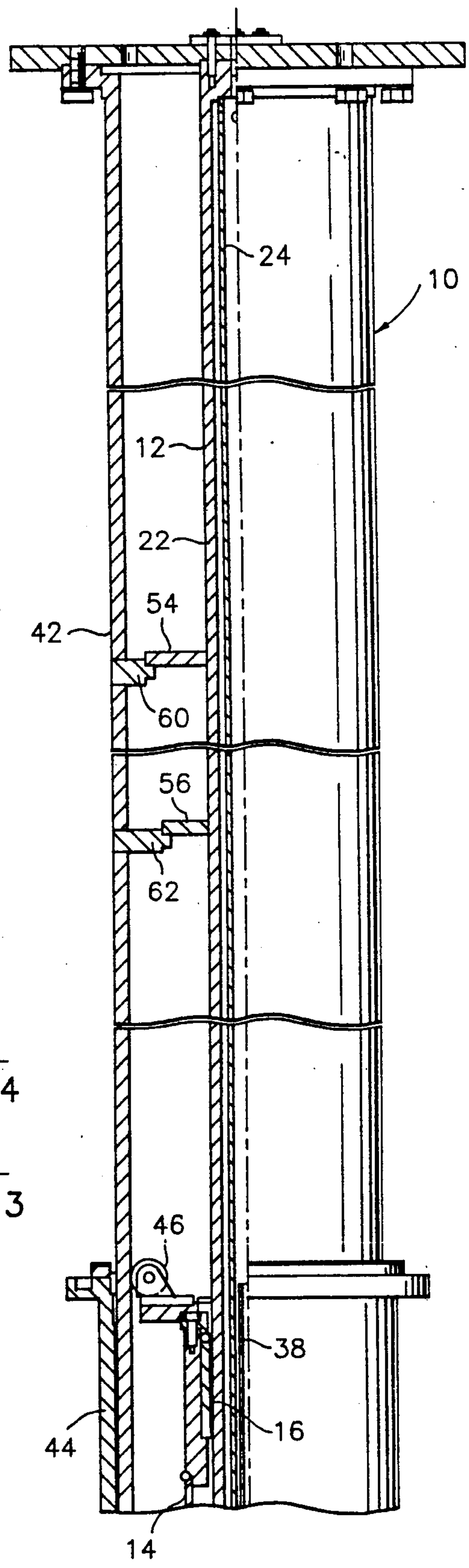
FIG. 2 is a fragmentary elevational view of the upper end of the cylinder with the piston fully extended and the coacting abutment and guide structures operatively engaged with each other between the piston and the large piston sleeve, portions of the piston and the cylinder sections being broken away and illustrated in vertical section.
Figure 3:
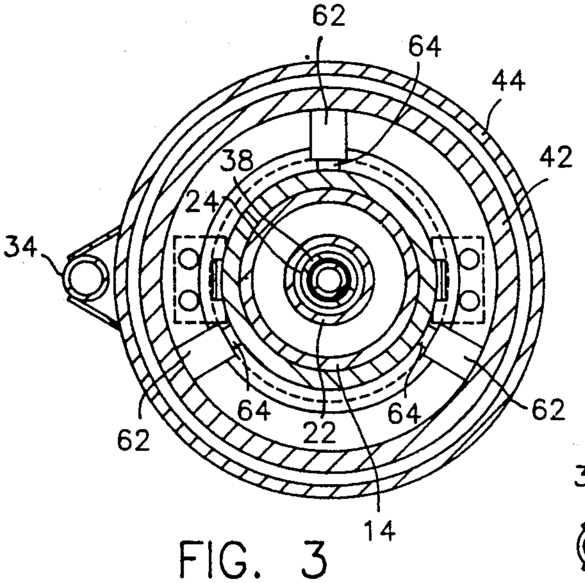
FIG. 3 is a horizontal sectional view taken substantially upon the plane indicated by the section line 3—3 of FIG. 1.
Figure 4:
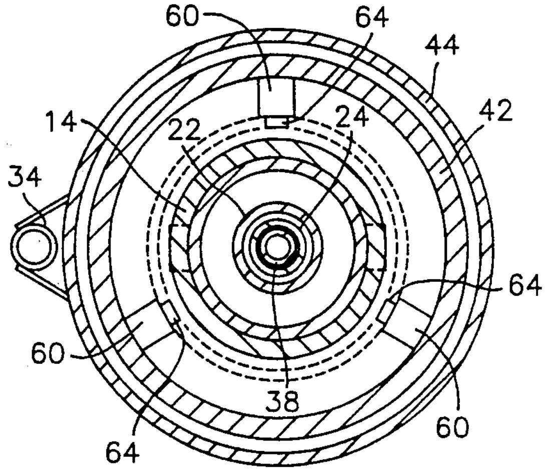
FIG. 4 is a horizontal sectional view taken substantially upon the plane indicated by the sectional line 4—4 of FIG. 1.
Figure 5:
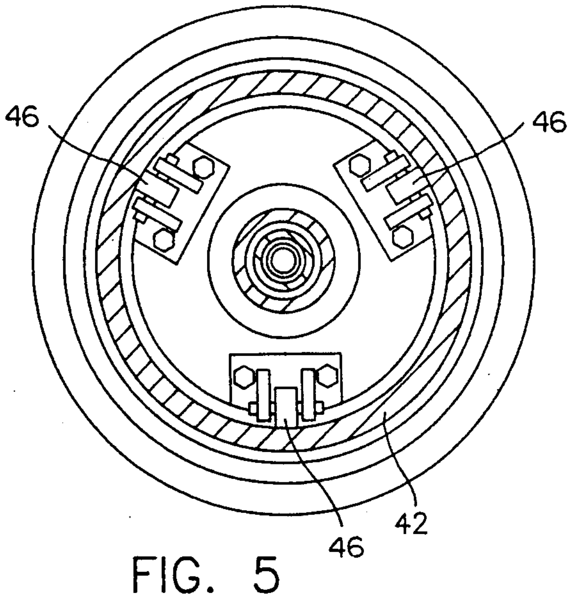
FIG. 5 is a horizontal sectional view taken substantially upon the plane indicated by the section line 5—5 of FIG. 1.
Figure 6:
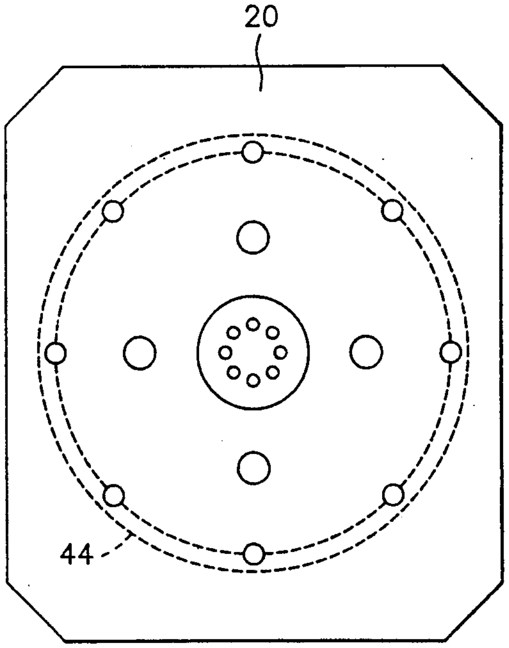
FIG. 6 is a top plan view of the cylinder assembly.

Referring now more specifically to FIGS. 1 and 2 of the drawings, the reference numeral 10 generally designates the telescopic cylinder of the invention. The cylinder includes elongated, relatively extendable retractable telescopically engaged piston and cylinder sections 12 and 14 with seal structure 16 forming a sliding fluid tight seal between the sections 12 and 14.

The lower end of the cylinder 10 includes a mount portion 18 which may be used in order rigidly support the lower end of the cylinder 10 in any convenient manner and the upper end of the piston section 12 has a load platform supported therefrom. The piston section 12 includes a first tubular member 22 descending downwardly from the load platform 20 and with which the seal structure 16 is engaged and a second tubular member 24 also descending downwardly from the load platform 20 within the first tubular member 22 and having its lower end braced relatively to the lower end of the tubular member 22 as at 26, the lower ends of the tubular members 22 and 24 being open.

The lower end portion of the tubular member 22 includes stop structure 26 for engagement with the cylinder section as at 28 to limit extension of the piston section 12 relative to the cylinder section 14 and the first tubular member further includes a radial vent 30 therethrough communicating the annular area within the cylinder section 14 disposed immediately outward of the first tubular member 22 with the annular area disposed immediately inwardly of the first tubular member 22 and exteriorly of the second tubular member 24. Still further, the mounting portion 18 includes a fluid inlet and outlet passage 32 relative to which one end of a supply and return line 34 is sealingly connected and the inlet and outlet passage 32 opens into a vertical passage section 36 formed in the mounting portion 18 and opening upwardly into the interior of the cylinder section 14, a third tubular member or delivery pipe 38 having its lower end sealingly secured in the vertical passage section 36 and its upper end disposed closely adjacent the upper end of the second tubular member 24 when the piston section 12 is fully downwardly retracted as illustrated in FIG. 1. In addition, the upper end of the second tubular member 24 includes exhaust ports 40 formed therein substantially horizontally registered with the upper end of the third tubular member or delivery pipe 38 when the piston section 12 is fully retracted.

The piston section 12 includes a large diameter first sleeve 42 depending downwardly from the load platform or plate 20 and which is substantially fully loosely downwardly telescoped over the cylinder section 14 when the piston section 12 is fully retracted. In addition, the cylinder section 14 includes a large diameter second sleeve 44 which is almost fully upwardly telescoped over the first sleeve 42 when the piston 12 is fully retracted.

The upper end of the cylinder section 14 includes a plurality of radially outwardly offset and circumferentially spaced rollers 46 journaled therefrom rollingly and guidingly engaged with the inner surface of the sleeve 42, the lower end of the first sleeve 42 includes inwardly offset guide and seal structure 48 guidingly engaged with the outer surface of the cylinder section 14 and preventing relative rotation between the sleeve 42 and cylinder section 14 by any suitable means (not shown). Further, guide and seal structure 50 is carried by the upper end of the second sleeve 44 and sealingly and guidingly engaged with the outer surface of the first sleeve 42 and a seal structure 51 is provided and forms a seal between sleeve 42 and the upper end of sleeve 44.

As may be seen from the upper portion of FIG. 1 and the vertical center portion FIG. 2, a pair of large and small diameter guide discs 54 and 56 are slidably engaged on the upper end of the first tubular member 22 of the piston section 12 and are normally gravity biased downward thereon into contact with the stop structure 58 provided on the piston section 12 immediately inward of the rollers 46. The guide disc 56 rests upon the stop structure 58 and the guide disc 54 rests upon the guide disc 56, see FIG. 1. In addition, the first sleeve 42 carried by the piston section 12 includes two sets of radially inwardly projecting and circumferentially spaced abutment and support members 60 and 62. The abutment and support members 60 equal three in number and are evenly circumferentially spaced about the interior of the first sleeve 42 and the abutment and support members 62 also equal three in number and are evenly circumferentially spaced about the sleeve 42. Further, the abutment and support members 60 and 62 are each provided with an upwardly opening notch 64.

The guide disc 54 is of a larger diameter than the guide disc 56 and the abutment and support members 62 project further inwardly than the abutment and support members 60. Further, the abutment and support members 60, during initial upward extension of the piston section 12 including the first sleeve 42, move upwardly past the guide disc 56 and then abut and upwardly displace the guide disc 54 with the latter snugly seated in the notches 64 of the abutment and support members 60. Then, upon further upward extension of the piston section 12, the abutment and support members 62 engage and upwardly displace the guide disc 56 with the latter snugly seated in the notches 64 of the abutment and support members 62.

With attention invited to FIG. 2, it may be seen that when the guide disc 54 is seated in the notches 64 of the abutment and support members 60, three radial braces between radially opposing portions of the first sleeve 42 and the first tubular member 22 of the piston section 12 are defined and that when the guide disc 56 is seated in the notches 64 of the abutment and support members 60 three further radial braces are defined between the first sleeve 42 and the first tubular member 22 of the piston section 12.

The above referred to radial braces, when disposed as illustrated in FIG. 2, thereby insure that adjacent portions of the first sleeve 42 and the first tubular member 22 of the piston section 12 are braced against relative lateral deflection. Consequently, a relatively long cylinder such as the cylinder 10 is exceptionally braced against lateral deflection exteriorly of the piston section 12. These lateral braces in conjunction the rollers 46, the guide and seal structure 48, the guide and seal structure 16, and the guide and seal structure 50 function to provide a high load lifting capacity cylinder which is capable of lifting the supported load through a considerable vertical distance by utilizing a relatively small volume of pressurized fluid under relatively high pressure, all while utilizing a telescopic cylinder offering considerable resistance to lateral loading.

Not only is it desirable to provide a cylinder of great extended length which requires a minimum volume of pressurized fluid to effect maximum extension thereof with a minimum amount of power, but the rate at which the cylinder may be extended is greatly increased. Furthermore, the considerable lower volume of fluid required to extend the cylinder may be handled by relatively small diameter hoses and/or pipes which are inherently stronger for a given wall thickness.

Because of the ports 40 at the upper end of the second tubular member 24 and the vent 30 in the first tubular member 22 immediately above the stop structure 26, any air entering the cylinder 10 along with the hydraulic fluid or entering the cylinder section 14 past a bad seal and collecting within the cylinder section 14 outwardly of the first tubular member 22 will be automatically vented therefrom through the vent 30 when the piston section 12 reaches its fully extended position with the stop structure 26 abutted against 28. This allows substantially all of the air accumulating outwardly of the first tubular member 22 to be vented through the vent 30 into the interior of the first tubular member 22 and to past through the ports 40 for movement downward through the third tubular member or pipe 38 during final retraction of the piston 12, inasmuch as the down flow of hydraulic fluid through the third tubular member 38 during final retraction of the piston section 12 is at a greater rate than the rate of air bubble rise through the hydraulic fluid. Of course, once any air or air bubbles past downwardly through passage section 36 and into the supply and return line 34, such air is vented back to the hydraulic fluid supply system to which the end of the supply and return line 34 remote from the cylinder 10 is connected.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An upstanding telescopic cylinder with increased side loading capacity and including upper and lower ends, said cylinder including an elongated piston section and an elongated cylinder section, said sections being relatively extendable and retractable and telescopically engaged with said piston section projecting outwardly of the upper end of said cylinder section, said piston section including a first sleeve concentric therewith and loosely telescoped over said cylinder section from the upper end thereof, said cylinder section including a second sleeve telescoped over said first sleeve from the lower end of said first sleeve, said cylinder and piston sections including coacting sliding seal means sealing said piston section to said cylinder section, adjacent the upper end thereof, including first guide means guidingly engaged with the inner surface of said first sleeve, the lower end of said first sleeve including second guide means guidingly engaged with the exterior of said cylinder section, said second sleeve including third guide means adjacent the upper end thereof guidingly engaged with the exterior of said first sleeve, said piston section including at least one guide slidingly disposed thereon above the upper end of said cylinder section, gravity biased downwardly into engagement with stop means provided therefore on the upper end of said cylinder section and loosely received within said first sleeve, said first sleeve including internal abutment means thereon intermediate the upper end and lower ends thereof operative to engage and elevate said guide therewith during an intermediate portion of extension of said piston section relative to said cylinder section and, when engaged with said guide forming, a brace between said piston section and first sleeve preventing relative lateral displacement of the adjacent portions of said piston section and said first sleeve.

2. The telescopic cylinder of claim 1 wherein said piston section includes multiple guides slidingly disposed thereon above the upper end of said cylinder section, gravity biased downwardly into engagement with stop means provided therefore on the upper end of said cylinder section, loosely received within said first sleeve and with each guide above the lowest guide being larger in plan area than the guide disposed immediately therebelow, said first sleeve including multiple internal abutment means spaced therealong intermediate the upper and lower ends thereof operative to successively engage and elevate a corresponding guide of said guides therewith during extension of said piston section relative to said cylinder section and, when engaged with the corresponding guide, to form a brace therewith between said piston section and said first sleeve preventing relative lateral displacement of the adjacent portions of said piston section and said first sleeve.

3. The telescopic cylinder of claim 1 wherein said first guide means includes rollers journaled from the exterior of the upper end of said cylinder section rollingly engaged with inner surface of said first sleeve.

4. An upstanding telescopic cylinder with increased side loading capacity and including upper and lower ends, said cylinder including an elongated piston section and an elongated cylinder section, said sections being relatively extendable and retractable and telescopically engaged with said piston section projecting outwardly of the upper end of said cylinder section, said piston section including a first sleeve concentric therewith and telescoped over said cylinder section from the upper end of said cylinder section, said cylinder and piston sections including coacting sliding seal means sealing said piston section to said cylinder section, said cylinder section, adjacent the upper end thereof, including first guide means guidingly engaged with the inner surface of said first sleeve, the lower end of said first sleeve including second guide means guidingly engaged with the exterior of said cylinder section, said piston section including at least one guide slidingly disposed thereon above the upper end of said cylinder section gravity biased downwardly into engagement with stop means provided therefore on the upper end of said cylinder section and loosely received within said first sleeve, said first sleeve including internal abutment mean thereon intermediate the upper and lower ends thereof operative to engage and elevate said guide therewith during an intermediate portion of extension of said piston section relative to said cylinder section and, when engaged with said guide, forming a brace between said piston section and first sleeve preventing relative lateral displacement of the adjacent portions of said piston section and said first sleeve.

5. The telescopic cylinder of claim 4 wherein said piston section includes multiple guides slidingly disposed thereon above the upper end of said cylinder section, gravity biased downwardly into engagement with stop means provided therefore on the upper end of said cylinder section, loosely received within said first sleeve and with each guide above the lowest guide being larger in plan area than the guide disposed immediately therebelow, said first sleeve including multiple internal abutment means spaced therealong intermediate the upper and lower ends thereof operative to successively engage and elevate a corresponding guide of said guides therewith during extension of said piston section relative to said cylinder section and, when engaged with the corresponding guide, to form a brace therewith between said piston section and said first sleeve preventing relative lateral displacement of the adjacent portions of said piston section and said first sleeve.

6. The telescopic cylinder of claim 4 wherein said first guide means includes rollers journaled from the exterior of the upper end of said cylinder section rollingly engaged with inner surface of said first sleeve.

7. The telescopic cylinder of claim 5 wherein said guides each comprise a substantially annular disc slidably mounted on said piston section and each of said abutment means comprises a set of peripherally spaced and upwardly opening notch equipped abutment members spaced about and projecting inwardly from the inner surface of said first sleeve, each disc including peripherally spaced portions thereof seatable within the corresponding set of upwardly opening notches.

8. The telescopic cylinder of claim 4 wherein said piston section comprises a first tubular member telescoped downwardly into said cylinder section in fluid tight sealed engagement with the upper end of said cylinder section and said cylinder section includes a second tubular member loosely telescoped upwardly into said first tubular member open at its upper end and adapted at its lower end for connection with a fluid supply and discharge line.

9. The telescopic cylinder of claim 8 wherein said piston section includes a third tubular member concentric with and disposed within said first tubular member, including an open lower end and loosely telescoped downwardly over said second tubular member, the upper end of said third tubular member being closed, the lower end of said third tubular member being sealed relative to the lower end of said first tubular member, the upper end of said second tubular member having radial oil exhaust port means opening therethrough from the interior thereof to the exterior thereof.

10. The telescopic cylinder of claim 9 wherein the lower end of said first tubular member includes vent means opening radially therethrough above the level at which the third tubular member is sealed relative to the lower end of said first tubular member.

11. An upstanding telescopic cylinder including an elongated piston section and an elongated cylinder section, said sections being relatively extendable and retractable and telescopically engaged with said piston section projecting outwardly of the upper end of said cylinder section, said cylinder and piston sections including coacting sliding seal means sealing said piston section to said cylinder section, said piston section comprising a first tubular member telescoped downwardly into said cylinder section, said cylinder section including a second tubular member loosely telescoped upwardly into said first tubular member, open at its upper end and adapted at its lower end for connection with a fluid supply and discharge line, said piston section including a third tubular member concentric with and disposed within said first tubular member, including an open lower end and loosely telescoped downwardly over said second tubular member, the upper end of said third tubular member being closed, the lower end of said third tubular member being sealed relative to the lower end of said first tubular member, the upper end of said second tubular member having radial oil exhaust port means opening therethrough from the interior of said second member to the exterior of said second tubular member.

12. The telescopic cylinder of claim 11 wherein the lower end of said first tubular member includes radial vent means formed therethrough above the level at which the lower end of said first and third tubular members are sealed relative to each other.

* * * * *